(12) United States Patent
Jeon

(10) Patent No.: US 7,173,386 B1
(45) Date of Patent: Feb. 6, 2007

(54) APPARATUS FOR DETECTING OVER CURRENT OF DUAL MOTOR IN VEHICLE

(75) Inventor: Young-Chang Jeon, Soe-gu (KR)

(73) Assignee: Siemens VDO Halla, Ltd. (KR)

( * ) Notice: Subject to any disclaimer, the term of this patent is extended or adjusted under 35 U.S.C. 154(b) by 0 days.

(21) Appl. No.: 11/202,630

(22) Filed: Aug. 12, 2005

(30) Foreign Application Priority Data

Jul. 13, 2005 (KR) .................. 10-2005-0063146

(51) Int. Cl.
H02P 5/68 (2006.01)
(52) U.S. Cl. .................. 318/53; 318/139; 318/434
(58) Field of Classification Search .................. 318/34, 318/53, 139, 430–434; 388/903
See application file for complete search history.

(56) References Cited

U.S. PATENT DOCUMENTS 5,266,787 A * 11/1993 Mazz et al. ............ 235/462.25
5,481,460 A * 1/1996 Masaki et al. ................ 701/50
5,664,048 A * 9/1997 Niemi et al. ................ 388/815
6,281,649 B1 * 8/2001 Ouellette et al. ........... 318/443

* cited by examiner

Primary Examiner—Bentsu Ro
(74) Attorney, Agent, or Firm—R. Neil Sudol; Henry D. Coleman; William J. Sapone (57) ABSTRACT

An apparatus for over current detection of a dual motor for use in a vehicle. This invention prevents each motor from burning out by more precisely detecting an over current of each motor in the dual motor within an overall drive area of the dual motor. This can be accomplished by setting, as an over current detection reference current, a predefined range between a normal current and a constraint current of each motor by drive input conditions of each use motor, detecting a current of each motor flowing in field effect transistor (FET) via a shunt resistor and a differential amplifier, and comparing the detected currents with the over current detection reference currents.

4 Claims, 12 Drawing Sheets

PRIOR ART

APPARATUS FOR DETECTING OVER CURRENT OF DUAL MOTOR IN VEHICLE

BACKGROUND OF THE INVENTION

1. Field of the Invention

The present invention relates to an apparatus for over current detection of a dual motor for use in a vehicle. More particularly, this invention is directed to an over current detection apparatus of a dual motor in a vehicle which is capable of preventing each motor from burning out by more precisely detecting an over current of each motor in the dual motor within an overall drive area thereof, wherein this is achieved by setting, as an over current detection reference current, a predefined range between a normal current and a constraint current of each motor by drive input conditions of each motor, detecting a current of each motor flowing in a field effect transistor (FET) via a shunt resistor and a differential amplifier, and comparing the detected currents with the over current detection reference currents.

2. Description of Related Art

In general, a dual motor is known to provide a driving force necessary for vehicle operation, wherein a power required by the vehicle is supplied by changing a rotary power under the control of a microprocessor. Such a dual motor may burn out due to over current that occurs due to internal, external, or constraint effects, etc., during the operation of the motor.

Figure 1:
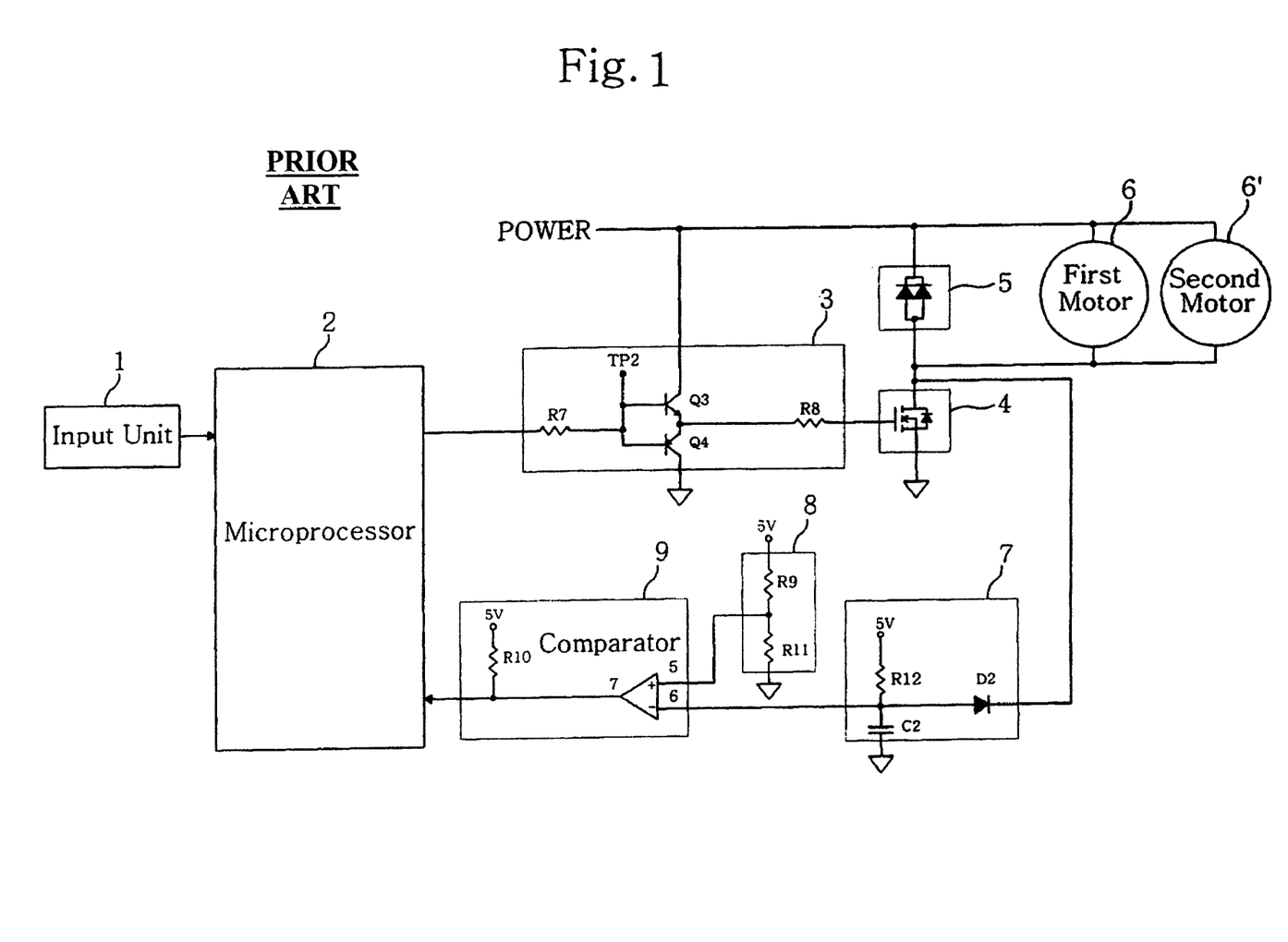
FIG. 1 illustrates a circuit diagram showing a configuration of an over current detection device of a dual motor used in a vehicle according to the prior art.

As such, since the prior art dual motor burns out due to over current unless such over current is accurately detected and the operation of the dual motor is stopped to prevent burn out upon the detection of the over current, an over current detection of the dual motor has conventionally been performed through an over current detection device as illustrated in FIG. 1, in order to prevent the above phenomenon.

FIG. 1 is a circuit diagram showing a configuration of an over current detection device of a dual motor used in a vehicle according to the prior art. This prior art device comprises an input unit 1 for inputting an external signal including motor drive information with duty cycle, a microprocessor 2 that provides an FET drive control signal to drive an FET according to the motor drive information in the external signal from the input unit 1, determines whether or not there occurs an over current state in the dual motor based on an output from a comparison unit 9 to be described below, and controls the dual motor to halt its operation upon the occurrence of the over current, an FET driver 3 for generating an FET drive signal in response to the FET drive control signal provided by the microprocessor 2, an FET 4 as a dual motor driving element that is turned ON/OFF depending on the FET drive from the FET driver 3 to drive the dual motor simultaneously, a freewheeling diode 5 for passing a recovery current for continuous operation of the dual motor when the FET 4 is OFF, a first and a second motors 6 and 6' as the dual motor that are driven according to the operations of the FET 4 and the freewheeling diode 5 and provide a driving force necessary for the vehicle's operation, a voltage detector 7 for detecting a voltage that is taken between both ends of the FET 4 produced by a current flowing in an internal resistor of the FET 4, a reference voltage setting unit 8 for setting an over current detection voltage for the first and the second motors 6 and 6' as a reference voltage, and the comparison unit 9 for comparing the voltage detected by the voltage detector 7 with the reference voltage set by the reference voltage setting unit 8 and providing the microprocessor 2 with an output voltage of high level implying the normal state if the detected voltage is less than the reference voltage and with an output voltage of low level meaning the issuance of the over current state if the detected voltage is above the reference voltage.

Figure 2A:
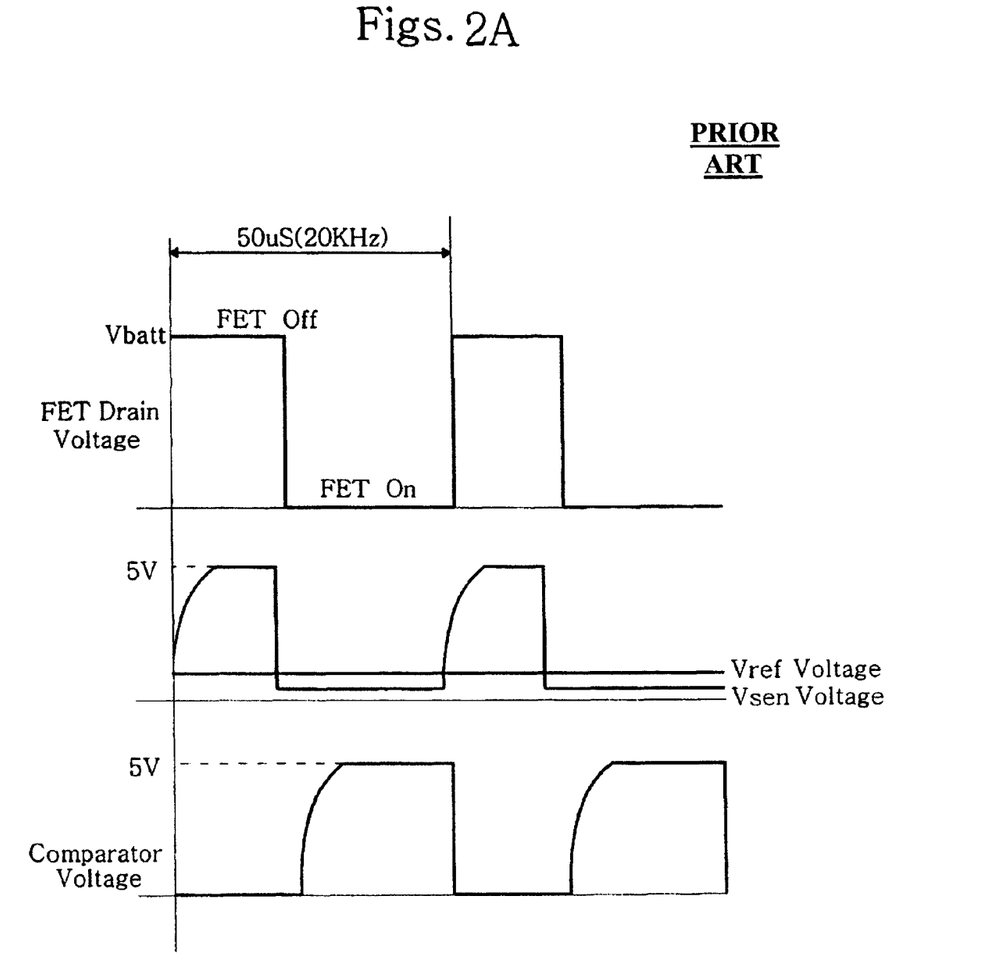
FIGS. 2A and 2B show output waveforms resulting when the dual motor is in the normal state and over current state, respectively, according to the conventional over current detection device.
Figure 2B:
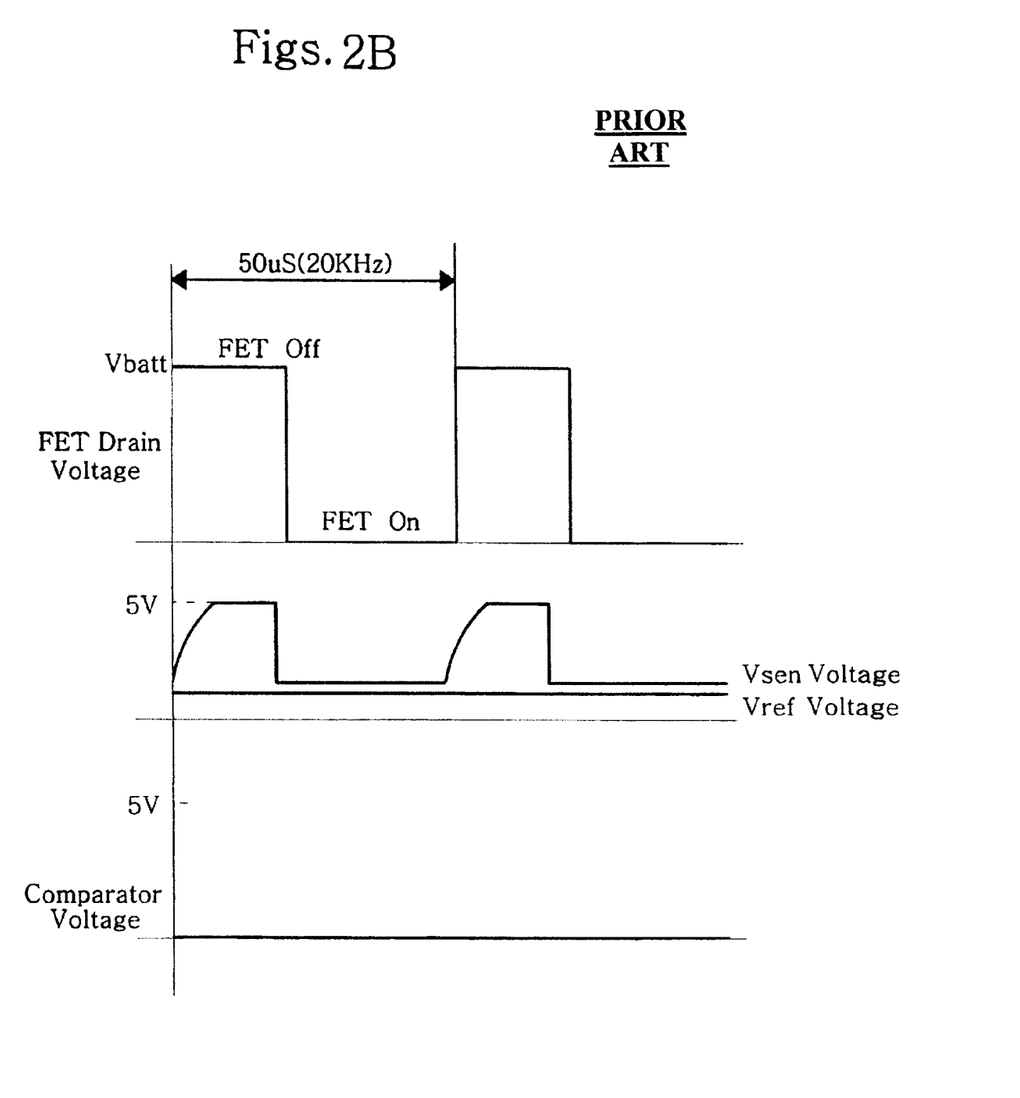

FIGS. 2A and 2B show output waveforms resulting when the dual motor is in the normal state and over current state, respectively, according to the conventional over current detection device. With reference to these drawings, an operation of the conventional over current detection device will be described in detail below.

At first, the microprocessor 2 in the prior art over current detection device inputs the motor drive information included in the external signal from the input unit 1 and controls the FET driver 3 according to the motor drive information in order to drive the FET 4 as the dual motor driving element. Upon the ON operation of the FET 4, the first and the second motors 6 and 6' are driven by a power (or supply voltage); and upon the OFF operation of the FET 4, the recovery currents issuing from the first and the second motors 6 and 6' enable them to be continuously driven by passing those currents flowed through the freewheeling diode 5.

The FET 4 includes an internal resistor and the ON operation of the FET 4 is controlled according to the motor drive information. Based on the current variation by such ON operation of the FET 4, the voltage taken between both ends of the internal resistor in the FET 4 is varied.

After that, a comparator contained in the comparison unit 9 compares the voltage between both ends of the FET 4 detected by the voltage detector 7 with the reference voltage provided by the reference voltage setting unit 8. From the comparison, the comparator provides the microprocessor 2 with an output voltage of 5 V if the detected voltage is less than the reference voltage, and with an output voltage of 0 V if not, i.e., if the detected voltage is above the reference voltage.

Then, the microprocessor 2 determines that the first and the second motors 6 and 6' are in the normal state if the output voltage from the comparison unit 9 is at a high level of 5 V; and conversely, it determines that an over current state is present in any one or all of the first and the second motors 6 and 6' if the output voltage is at a low level of 0 V, and halts the operation of those motors, in order to prevent the motors from burning out due to the occurrence of the over current.

In the conventional over current detection device of the dual motor for use in the vehicle as mentioned above, however, there exist some problems as set forth below.

That is, since the internal resistor in the FET exhibits slight variation due to manufacturing tolerances and thus is varied depending upon the temperature for the same FET, a dispersion of the detected voltage by the current flowing in the FET becomes large.

Consequently, there may be a problem that the power necessary for the vehicle's operation is not supplied thereto due to the interruption of the dual motor that arises when the detected voltage exceeds the reference voltage upon their comparison, even under the normal state. In particular, in the case of an engine cooling motor, the engine may overheat, causing the vehicle to break down.

Further, under the condition that an over current may occur, if the dual motor is driven continuously as the detected voltage is less than the reference voltage to thereby make an issuance of a larger current, there ultimately exists an instance where the dual motor burns out.

In addition, since the reference voltage set by the reference voltage setting unit for the over current detection cannot be modified, it may be determined that the detected voltage is less than the reference voltage, upon an issuance of the motor over current when the motor is driven with low current. Accordingly, over current of the dual motor is not detected, leading to motor burn out.

Especially, in case the dual motor is simultaneously driven, when one motor with low capacity is in constraint state, a current of one motor is combined with that of the other motor with large capacity. In such a case, in the range below the maximum current for the normal drive of the motor with the large capacity, it is difficult to sense the over current state of the motor with the low capacity, which results in burn out of that motor.

SUMMARY OF THE INVENTION

It is, therefore, a primary object of the present invention to provide an over current detection apparatus of a dual motor in a vehicle which is capable of preventing each motor from burning out by more precisely detecting an over current of each motor in the dual motor within an overall drive area thereof, wherein this is achieved by setting, as an over current detection reference current, a predefined range between a normal current and a constraint current of each motor by drive input conditions of each motor, detecting a current of each motor flowing in FET via a shunt resistor and a differential amplifier, and comparing the detected currents with the over current detection reference currents.

In accordance with the present invention, there is provided an apparatus for detecting an over current of a dual motor in a vehicle, comprising: an input unit for inputting an external square wave signal including motor drive information with duty cycle, wherein the signal is converted into an electric potential recognizable by a microprocessor; the microprocessor, which provides a drive control signal to drive a field effect transistor (FET) based on the motor drive information in the external square wave signal from the input unit, sets, as a first and a second over current detection reference currents to decide over current state, predefined ranges between normal currents and constraint currents by driving input conditions of each motor within an overall drive area of the dual motor, and compares a first and a second motor detection currents that correspond to output voltages from a first and a second smoothing units with the first and second reference currents, respectively, wherein it is decided that a first motor is in a normal state if the first detection current is less than the first reference current and in an over current state if the first detection current is greater than the first reference current, and a second motor is in a normal state if the second detection current is less than the second reference current and in an over current state if the second detection current is greater than the second reference current, and halts, if it is determined that one of the two motors is in the over current state, the operations of the two motors; a first FET driver for amplifying and outputting an FET drive signal to drive the first motor in response to the FET drive control signal provided by the microprocessor; a second FET driver connected to one end of the first FET driver for amplifying and outputting an FET drive signal to drive the second motor in response to the FET drive control signal provided by the microprocessor; a first and a second FETs that are turned ON/OFF in accordance with each of the FET drive signals from the first and the second FET drivers; a first and a second freewheeling diodes for passing recovery currents for continuous operation of the first and the second motors when the first and second FETs are OFF; the first and the second motors, which are driven in response to the operations of the first and second FETs and the first and the second freewheeling diodes, for providing a driving force necessary for vehicle operation; a first and a second shunt resistors connected to one ends of the first and second FETs for detecting a current of each of the first and the second motors flowing in each of the first and second FETs; a first and a second amplifiers for detecting and amplifying voltages produced by the currents flowing via the first and second shunt resistors, while eliminating ground electronic potential effects that vary depending upon currents by motor capacities that occur when the dual motor is being driven, using a differential amplifier; and the first and the second smoothing units for smoothing each of the voltages amplified by the first and the second amplifiers and providing the smoothed voltages to the microprocessor.

BRIEF DESCRIPTION OF THE DRAWINGS

The above and other objects and features of the present invention will become apparent from the following description of preferred embodiments taken in conjunction with the accompanying drawings, in which.

DESCRIPTION OF THE PREFERRED EMBODIMENT

Hereinafter, a structure and an operation of an over current detection apparatus of a dual motor used in a vehicle in accordance with the present invention will be explained in detail with reference to the accompanying drawings.

Figure 3:
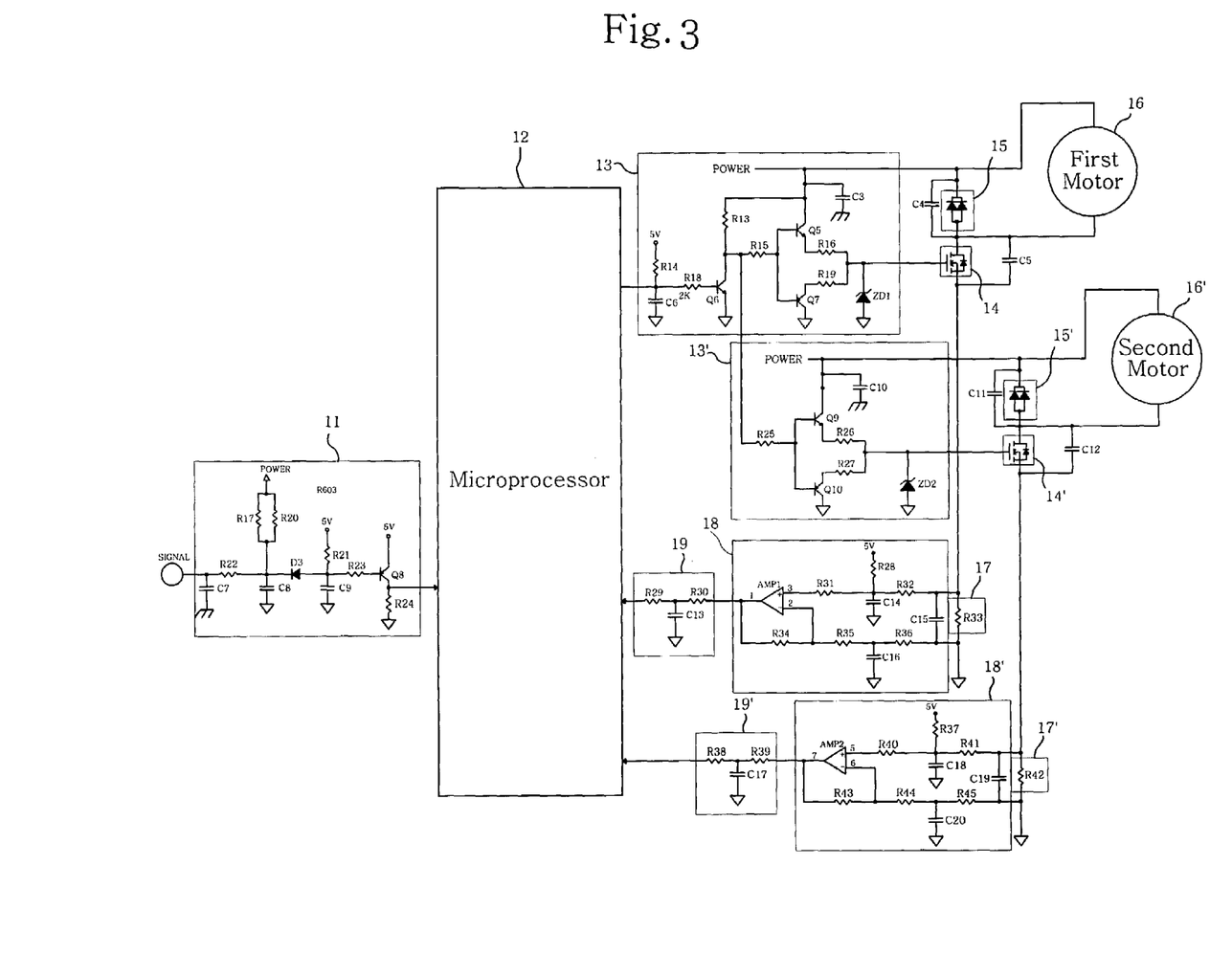
FIG. 3 is a circuit diagram showing a configuration of an over current detection apparatus of a dual motor for a vehicle in accordance with a preferred embodiment of the present invention.

FIG. 3 is a circuit diagram showing a configuration of an over current detection apparatus of a dual motor for a vehicle in accordance with a preferred embodiment of the present invention. The inventive apparatus comprises an input unit 11 for inputting an external square wave signal including motor drive information with duty cycle wherein the signal is converted into an electric potential of 5 V recognizable by a microprocessor 12 to be described below, the microprocessor 12 which provides an FET drive control signal to drive an FET based on the motor drive information in the external square wave signal from the input unit 11, sets, as a first and a second over current detection reference currents to detect an over current state, predetermined ranges between a normal current and a constraint current of each motor by drive input conditions of each motor within an overall drive area of the dual motor, compares a first and a second motor detection currents that correspond to output voltages from a first and a second smoothing units 19 and 19' to be mentioned later with the first and second reference currents, respectively, wherein it is determined that a first motor is in a normal state if the first detection current is less than the first reference current and in an over current state if not, and that a second motor is in a normal state if the second detection current is less than the second reference current and in an over current state if not so, and controls, when one of the two motors is bound and in the over current state, the two motors to stop their operations, a first FET driver 13 for amplifying and outputting an FET drive signal to drive the first motor in response to the FET drive control signal provided by the microprocessor 12, a first FET 14 that is turned ON/OFF in accordance with the FET drive signal from the first FET driver 13, a first freewheeling diode 15 for passing a recovery current for continuous operation of the first motor when the first FET 14 is OFF, the first motor 16, which is driven in response to the operation of the first FET 14 and the first freewheeling diode 15, for providing a driving force necessary for the vehicle's operation, a first shunt resistor 17 connected to one end of the first FET 14 for detecting a current of the first motor 16 flowing in the first FET 14, a first amplifier 18 for detecting and amplifying voltage produced by the current flowing via the first shunt resistor 17, while eliminating ground electronic potential effects that vary depending upon currents by motor capacities that occur when the dual motor is driven, using a differential amplifier Amp1, and the first smoothing unit 19 for smoothing the voltage amplified by the first amplifier 18 and providing it to the microprocessor 12. In addition, the apparatus of the invention further comprises a second FET driver 13' connected to one end of the first FET driver 13 for amplifying and outputting an FET drive signal to drive the second motor in accordance with the FET drive control signal provided by the microprocessor 12, a second FET 14' that is operated as ON/OFF in response to the FET drive signal from the second FET driver 13', a second freewheeling diode 15' for passing a recovery current for continuous operation of the second motor when the second FET 14' is OFF, the second motor 16', which is driven in accordance with the operation of the second FET 14' and the second freewheeling diode 15', for providing a driving force necessary for the vehicle's operation, a second shunt resistor 17' connected to one end of the second FET 14' for detecting a current of the second motor 16' flowing in the second FET 14', a second amplifier 18' for detecting and amplifying voltage produced by the current flowing via the second shunt resistor 17', while getting rid of ground electronic potential effects that vary depending upon currents by motor capacities that arise when the dual motor is driven, using a differential amplifier Amp2, and the second smoothing unit 19' for smoothing the voltage amplified by the second amplifier 18' and providing it to the microprocessor 12.

In the over current detection apparatus of the dual motor for the vehicle in accordance with the preferred embodiment of the present invention as structured above, in a state that the second FET driver 13' is coupled with one end of the first FET driver 3 and the first and the second motors 16 and 16' constituting the dual motor are driven simultaneously, an over current of each motor is first detected. And then, if an over current is detected from one or both of the motors, the invention makes the operations of all of the two motors stopped, to thereby prevent those motors from being burned.

Using the differential amplifiers Amp1 and Amp2 in detecting voltages generated by currents flowing through the first and the second shunt resistors 17 and 17' from the first and the second amplifiers 18 and 18', currents flowing in the first and second FETs 14 and 14' for driving the first and the second motors 16 and 16' can be detected more precisely, by removing effects that affect the current detection of a motor by current flowing in another motor when the dual motor is driven, that is, by removing effects that impact the current detection of the motor with the low capacity when current flows in the motor with large capacity.

The operation of the over current detection apparatus of the dual motor for the vehicle in accordance with the invention as configured early will be explained in detail with reference to the accompanying drawings hereinafter.

Figure 4A:
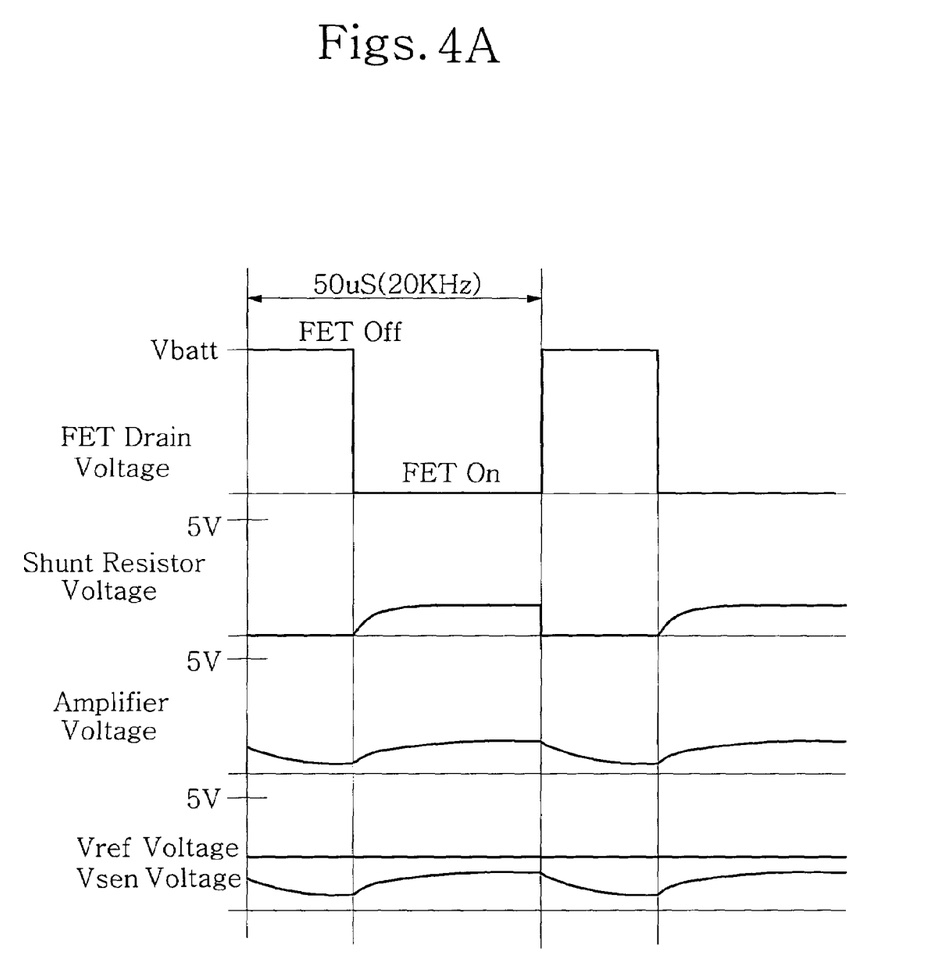
FIGS. 4A and 4B are output waveforms occurring when a first motor is in a normal state and over current state, respectively, in accordance with the over current detection apparatus of the invention.
Figure 4B:
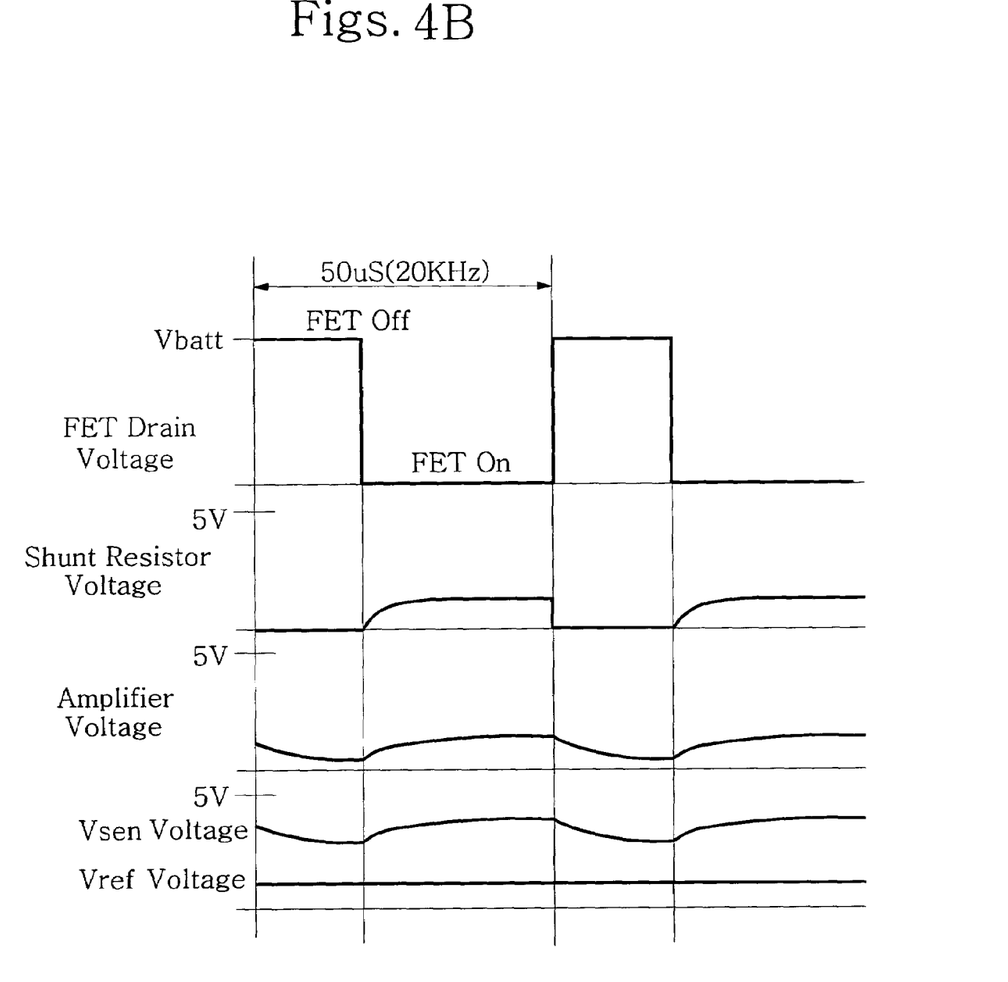
Figure 5A:
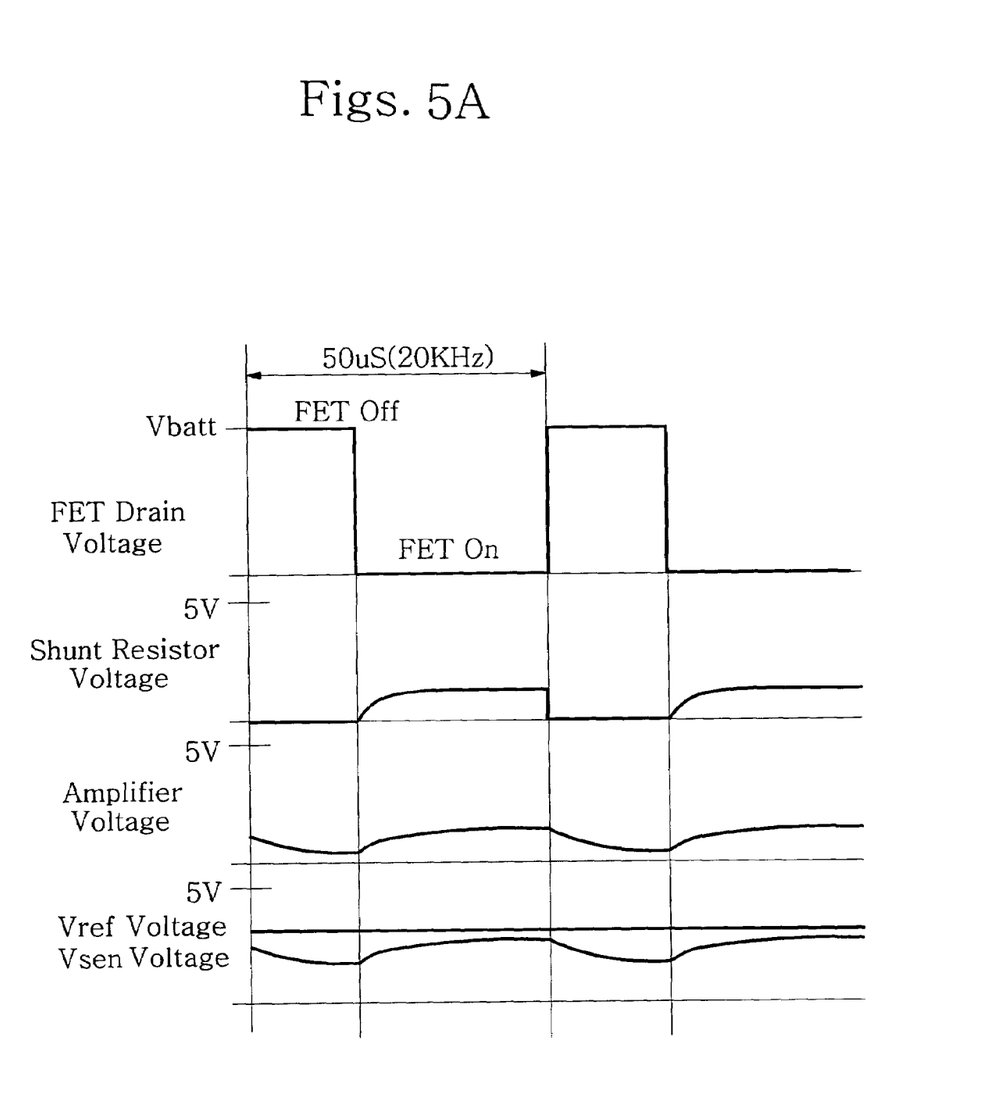
FIGS. 5A and 5B are output waveforms obtaining when a second motor is in a normal state and over current state, respectively, in accordance with the over current detection apparatus of the invention.
Figure 5B:
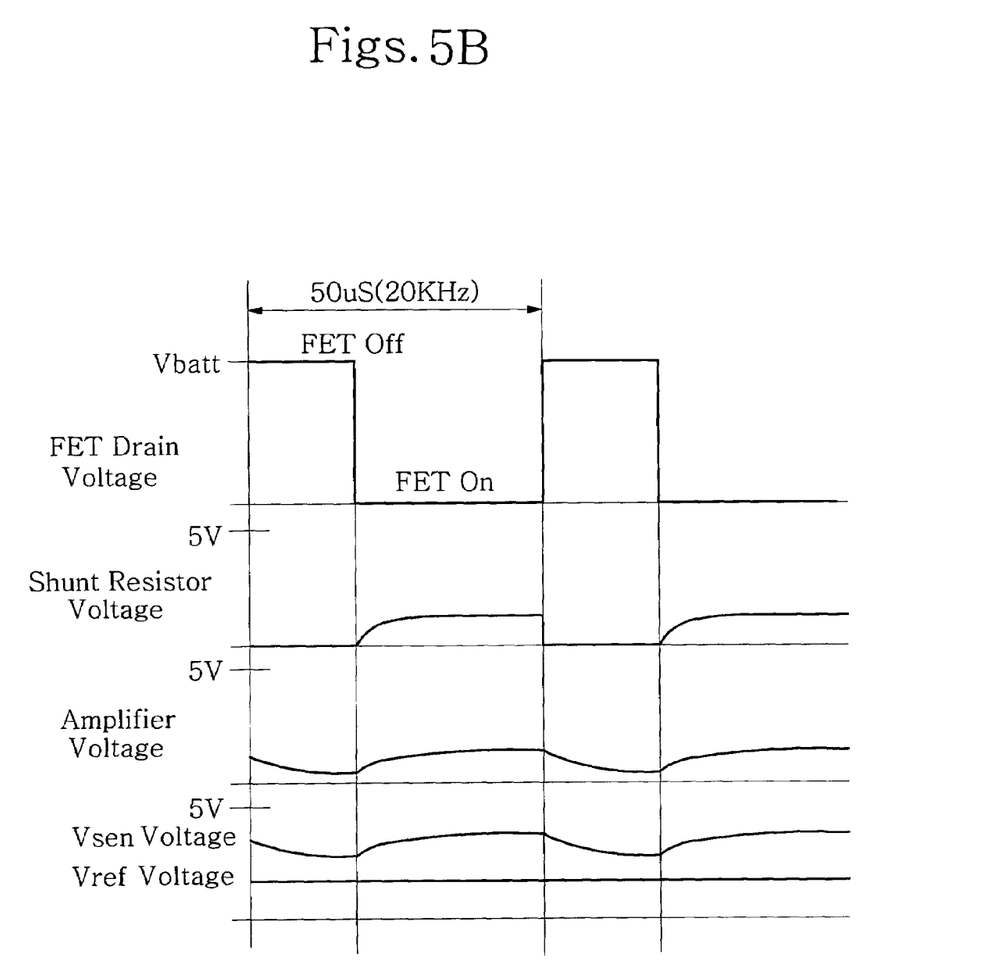

FIGS. 4A and 4B are output waveforms resulting when the first motor in accordance with the over current detection apparatus of the invention is in the normal state and over current state, respectively, and FIGS. 5A and 5B are output waveforms derived when the second motor in accordance with the over current detection apparatus of the invention is in the normal state and over current state, respectively. Referring to these drawings, details of the invention will now be given below.

First of all, in the drive control and over current detection operations of the first motor 16 in the dual motor, the input unit 11 inputs and converts an external square wave signal SIGNAL containing motor drive information such as duty cycle into an electronic potential of 5 V recognizable by the microprocessor 12.

Then, the microprocessor 12 computes the motor drive information by measuring a length of high or low level of the external square wave signal from the input unit 11.

Next, the microprocessor 12 provides the first FET driver 13 with an FET drive control signal so as to drive the first motor 16 at a frequency of 20 KHz in accordance with the motor drive information as computed above.

According to this, the first FET driver 13 amplifies an FET drive signal based on the FET drive control signal and outputs it to the first FET 14 for its driving.

When the first FET 14 is ON, the first motor 16 is driven by a power (or supply voltage); and when it is OFF, the first motor 16 is driven continuously by passing a recovery current produced by that motor through the freewheeling diode 15.

At this time, if the first FET 14 providing a power necessary to drive the first motor 16 is ON, current flowing in the first motor 16 is passed through the first shunt resistor 17 connected to the lower end of the first FET 14.

Accordingly, the first amplifier 18 detects and amplifies a voltage produced by the current flowing through the first shunt resistor 17, while eliminating ground electronic potential effects that vary depending upon currents by motor capacities using the differential amplifier Amp1, and outputs it to the first smoothing unit 19.

Thereafter, the first smoothing unit 19 smoothes the voltage amplified by the first amplifier 18 and provides it to the microprocessor 12.

On the other hand, in the drive control and over current detection operations of the second motor 16', the second FET driver 13' connected to one end of the first FET driver 13 inputs the FET drive control signal outputted from the first FET driver 13 by the microprocessor 12; and, in response to this control signal, it amplifies and outputs the FET drive signal for driving the second motor 16' to the second FET 14', which thus drives the second FET 14'.

Further, as mentioned in the drive control and over current detection operations of the first motor 16, when the second FET 14' is ON, the second motor 16' is driven by a power; and when it is OFF, the second motor 16' is driven continuously by passing a recovery current produced by that motor through the second freewheeling diode 15'.

At this time, if the second FET 14' providing a power necessary to drive the second motor 16' is ON, current flowing in the second motor 16' is passed through the second shunt resistor 17' connected to the lower end of the second FET 14'.

Accordingly, the second amplifier 18' detects and amplifies voltage produced by the current flowing through the second shunt resistor 17', while eliminating ground electronic potential effects that vary depending upon currents by motor capacities using the differential amplifier Amp2, and outputs it to the second smoothing unit 19'.

Subsequently, the second smoothing unit 19' smoothes the voltage amplified by the second amplifier 18' and provides it to the microprocessor 12.

Next, the microprocessor 12 inputs the analog voltage from the first smoothing unit 19 and converts it into digital data corresponding to the voltage as the first motor detection current. Then, the converted digital data, i.e., the first detection current of the first motor 16 detected at the first shunt resistor 17 and the first amplifier 18 is compared with a first predefined over current detection reference current. As illustrated in FIGS. 4A and 4B, if the first detection current, VSen voltage, is less than the first reference current, Vref voltage, it is determined that the first motor 16 is in the normal state, and otherwise, it is determined that the first motor 16 is in the over current state.

Similarly, the microprocessor 12 gets the analog voltage from the second smoothing unit 19' and converts it into digital data corresponding to the voltage as a second motor detection current. Then, the converted digital data, i.e., the second detection current of the second motor 16' detected at the second shunt resistor 17' and the second amplifier 18 is compared with a second predefined over current detection reference current. As shown in FIGS. 5A and 5B, if the second detection current, VSen voltage, is less than the second reference current, Vref voltage, then it is determined that the second motor 16' is in the normal state, and otherwise, then it is determined that the second motor 16' is in the over current state.

As mentioned above, the microprocessor 12 determines the over current state of each of the first and the second motors 16 and 16' in the dual motor and cuts off, if it is determined that any one of the two motors is bound and in the over current state, the dual motor drive signal. This makes the supply voltage to the two motors interrupted and in turn their operations stopped, thus preventing the bound motor from burning out due to the over current.

Figure 6:
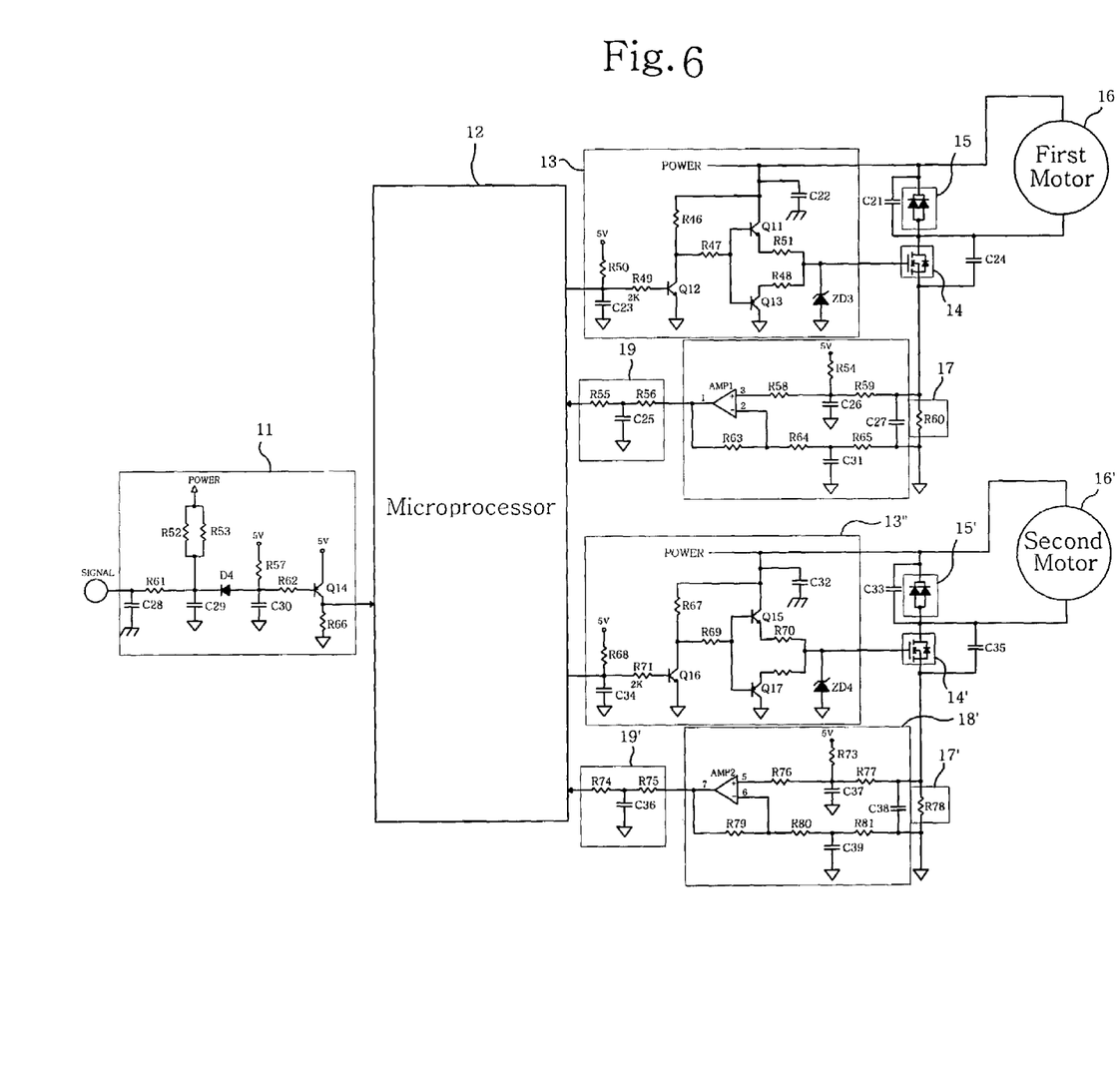
FIG. 6 is a circuitry diagram depicting a structure of an over current detection apparatus of a dual motor for a vehicle in accordance with another embodiment of the present invention.

On the other hand, FIG. 6 is a circuitry diagram depicting a structure of an over current detection apparatus of a dual motor for a vehicle in accordance with another embodiment of the present invention. As shown, the structure is almost same as that of the over current detection apparatus in accordance with the preferred embodiment of the present invention as disclosed in FIG. 3, and thus, its details will be omitted herein for simplicity purposes. However, it should be noted that the second FET driver 13" is not connected to one end of the first FET driver 13 but configured to input the FET drive control signal directly from the microprocessor 12, as illustrated in FIG. 6.

In other words, in the over current detection apparatus of the dual motor for the vehicle in accordance with another embodiment of the present invention, the microprocessor 12 provides the FET drive control signals to the first and the second FET drivers 13 and 13' respectively. By doing so, when the dual motor is driven, the microprocessor 12 can detect the over current state of each of the first and the second motors 16 and 16' in the dual motor; and from the detection, if it is determined that any one of the two motors is bound and in the over current state and the other motor is in the normal state, the normal other motor is driven, thus minimizing a power necessary for such driving.

In the meantime, processes of computing the normal current and constraint current of each motor by drive input conditions according to each motor in the overall drive area of the dual motor, setting each over current detection reference current from the computed normal current and constraint current, and detecting the state of the dual motor by the microprocessor 12 will be explained in detail with reference to FIGS. 7A, 7B, and 8 below.

Figure 7A:
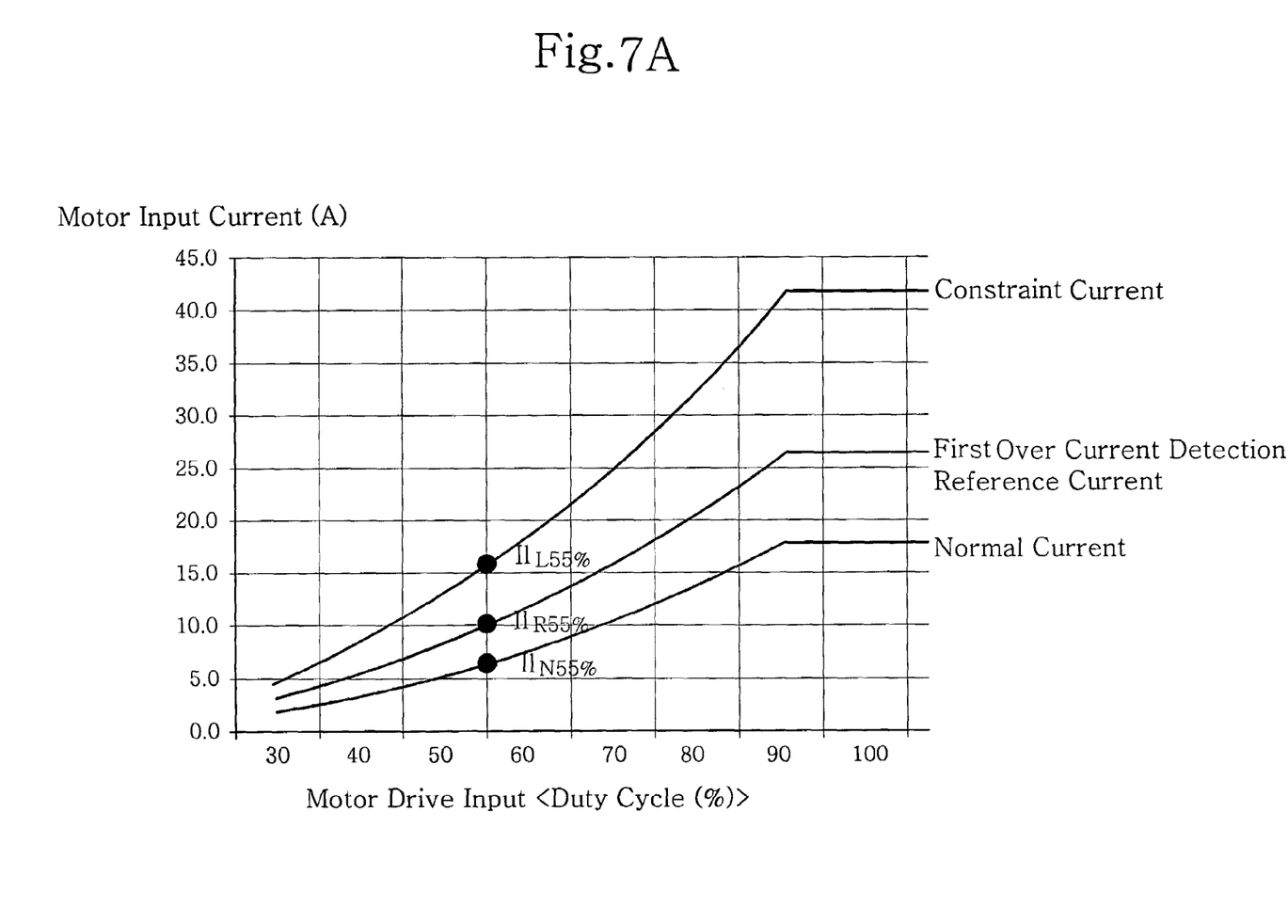
FIG. 7A shows a waveform of each of a normal current, a constraint current, and a first over current detection reference current of the first motor to set the first over current detection reference current by a microprocessor in the over current detection apparatus in accordance with the present invention.
Figure 7B:
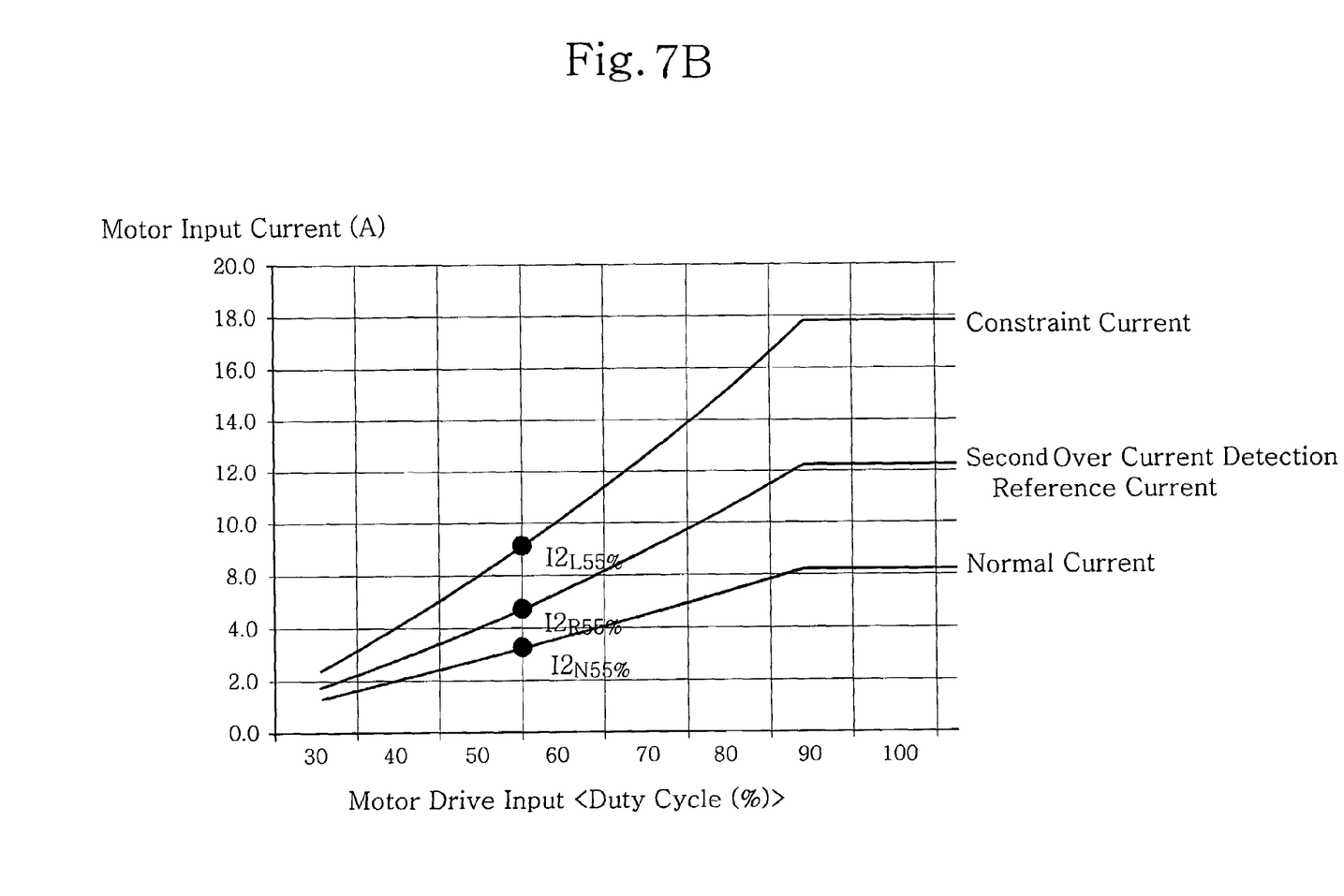
FIG. 7B depicts a waveform of each of a normal current, a bound current, and a second over current detection reference current of the second motor to set the second over current detection reference current by the microprocessor in the over current detection apparatus in accordance with the present invention.
Figure 8:
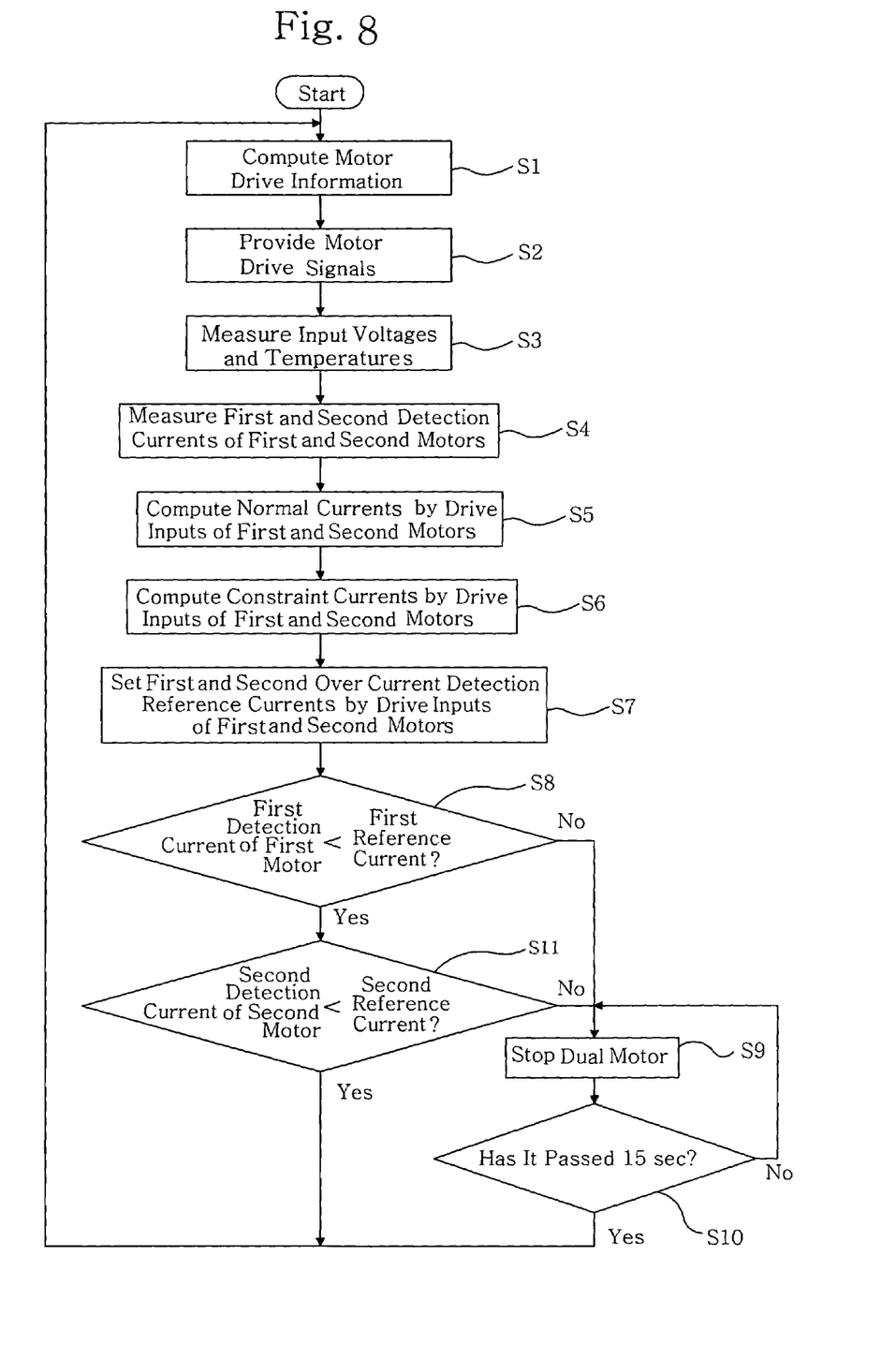
FIG. 8 illustrates a flow chart showing the setting operation of over current detection reference currents, and the over current detection operation of the dual motors being performed by the microprocessor in the over current detection apparatus in accordance with the present invention.

FIG. 7A shows a waveform diagram of each of the normal current, the constraint current, and the first over current detection reference current of the first motor when a duty cycle of the motor drive input is 55%, to set the first over current detection reference current by the microprocessor 12, FIG. 7B depicts a waveform of each of a the normal current, the bound current, and the second over current detection reference current of the second motor when a duty cycle of the motor drive input is 55%, to set the second over current detection reference current by the microprocessor 12, and FIG. 8 illustrates a flow chart showing the setting operation of the first and second over current detection reference currents, and the over current detection operation of the first and second motors performed by the microprocessor 12.

Specifically, first of all, the microprocessor 12 inputs the external square wave signal containing motor drive information from the input unit 11 and computes the motor drive information from the signal (S1). Next, it provides motor drive signals, i.e., an FET drive control signal and an FET drive signal, to operate the first and second motors 16 and 16' by driving the first and second FET drivers 13 and 13', and the first and second FETs 14 and 14' based on the computed motor drive information (S2).

Subsequently, the microprocessor 12 measures voltages supplied to the first and second motors 16 and 16' and temperatures of the motors (S3). That is, since the motor current is varied depending upon the voltage and temperature, the present invention precisely measures the current flowing in the dual motor, by computing the normal current and the constraint current flowing in the dual motor according to its drive input conditions by properly adding and modifying variations by the input voltage to the dual motor and its temperature when computing the normal current and constraint current. This precise current detection enables the accurate detection of the over current state, upon the next comparison and decision of the detection current and the over current detection reference current.

Next, the microprocessor 12 inputs the voltages produced at the first and second shunt resistors 17 and 17' by the currents flowing in the first and second motors 16 and 16' and the first and second FETs 14 and 14' through the first and the amplifiers 18 and 18' and the first and the second smoothing units 19 and 19', and converts them into digital data, thereby detecting the first and second currents of the first and second motors 16 and 16' (S4).

Thereafter, the microprocessor 12 computes the normal currents of the first and second motors 16 and 16', which correspond to the drive input conditions of the dual motor, by properly adding and modifying variations by the input voltages and temperatures of the dual motor measured at said step S3 (S5).

Further, the microprocessor 12 computes the constraint currents of the first and second motors 16 and 16', which correspond to the drive input conditions of the dual motor, by properly adding and modifying variations in the input voltages and temperatures of the dual motor measured at said step S3 (S6).

Next, the microprocessor 12 sets predefined ranges between the normal currents of the first and second motors 16 and 16' computed at said step S5 and the constraint currents of the first and second motors 16 and 16' computed at said step S6 as shown in FIGS. 7A and 7B, as the first and second over current detection reference currents of the motors, in order to decide the over current state (S7).

That is, by computing the normal current and constraint current of each motor by the drive input conditions for the dual motor in the overall drive area of the dual motor, and setting the predefined ranges between each of the normal currents and each of the constraint currents as computed, for example, the averages of each of the normal currents and each of the constraint currents as the over current detection reference currents, the changes of the over current detection reference currents are available for all the drive input conditions of the dual motor. As a result, this allows more precise detection of the over current state.

And then, the microprocessor 12 compares the first and second detection currents of the first and second motors 16 and 16' measured at said step S4 with the first and second over current detection reference currents set at said step S7, respectively. Specifically, it first compares the first detected current of the first motor 16 with the first over current detection reference current (S8); and determines that the first motor 16 is in the over current state if the first detected current is greater than the first reference current and makes those motors 16 and 16' interrupted for a preset time, e.g., 15 sec (S9 and S10). However, if the first detected current is less than the first reference current, the microprocessor 12 determines that the first motor 16 is in the normal state and then compares the second detected current of the second motor 16' with the second over current detection reference current (S11)

From the comparison at said step S11, if the second detected current of the second motor 16' is less than the second reference current, the microprocessor 12 determines that the second motor 16' is in the normal state and those motors 16 and 16 continue to be driven normally. However, if the second detected current of the second motor 16' is greater than the second reference current, it is determined that the second motor 16' is in the over current state and the operations of the motors 16 and 16' are stopped for a preset time, e.g., 15 sec, as described in the above comparison (S9 and S10).

As described above, the present invention enables the microprocessor to detect the over current that occurs in one or all of the two motors upon the operation of the dual motor, by using the normal currents and constraint currents of the dual motor, which exist for the drive input conditions of all the motors. By doing so, the present invention can prevent the dual motor from burning out, which allows the dual motor to be driven stably.

As a result, the present invention can prevent each motor from burning out by more precisely detecting an over current of each motor in the dual motor within the overall drive area thereof. This can be accomplished by setting, as an over current detection reference current, a predefined range between a normal current and a constraint current of each motor by drive input conditions of each motor, detecting a current of each motor flowing in FET via a shunt resistor and a differential amplifier, and comparing the detected currents with the over current detection reference currents.

In other words, by computing individual normal currents and constraint currents of each motor by drive input conditions for the dual motor in the overall drive area of the dual motor, and setting the predefined ranges between each of the normal currents and each of the constraint currents as computed, for example, the averages of each of the normal currents and each of the constraint currents as the over current detection reference currents, the changes of the over current detection reference current are available for all the drive input conditions of the dual motor. As a result, when one or all of the two motors is under the over current condition upon the operation thereof, the more precise detection of such over current state is possible. This can prevent the dual motor from burning out due to the over current, enabling the dual motor to be driven more stably.

While the present invention has been described with respect to the particular embodiments, it will be apparent to those skilled in the art that various changes and modifications may be made without departing from the spirit and scope of the invention as defined in the following claims.

What is claimed is:

1. An apparatus for detecting an over current of a dual motor in a vehicle, comprising:
   an input unit for inputting an external square wave signal including motor drive information with duty cycle, wherein the signal is converted into an electric potential recognizable by a microprocessor;
   the microprocessor, which provides a drive control signal to drive a field effect transistor (FET) based on the motor drive information in the external square wave signal from the input unit, sets, as a first and a second over current detection reference currents to detect an over current state, predefined ranges between normal currents and constraint currents by driving input conditions of each motor within an overall drive area of the dual motor, and compares a first and a second motor detection currents that correspond to output voltages from a first and a second smoothing units with the first and second reference currents, respectively, wherein it is determined that a first motor is in a normal state if the first detection current is less than the first reference current and in an over current state if the first detection current is greater than the first reference current, and a second motor is in a normal state if the second detection current is less than the second reference current and in an over current state if the second detection current is greater than the second reference current, and halts, if it is determined that one of the two motors is in the over current state, the operations of the two motors;

a first FET driver for amplifying and outputting an FET drive signal to drive the first motor in response to the FET drive control signal provided by the microprocessor;

a second FET driver connected to one end of the first FET driver for amplifying and outputting an FET drive signal to drive the second motor in response to the FET drive control signal provided by the microprocessor;

a first and a second FETs that are turned ON/OFF in accordance with each of the FET drive signals from the first and the second FET drivers;

a first and a second freewheeling diodes for passing recovery currents for continuous operation of the first and the second motors when the first and second FETs are OFF;

the first and the second motors, which are driven in response to the operations of the first and second FETs and the first and the second freewheeling diodes, for providing a driving force necessary for vehicle operation;

a first and a second shunt resistors connected to one ends of the first and second FETs for detecting a current of each of the first and the second motors flowing in each of the first and second FETs;

a first and a second amplifiers for detecting and amplifying voltages produced by the currents flowing via the first and second shunt resistors, while eliminating ground electronic potential effects that vary depending upon currents by motor capacities that occur when the dual motor is being driven, using a differential amplifier; and the first and the second smoothing units for smoothing each of the voltages amplified by the first and the second amplifiers and providing the smoothed voltages to the microprocessor.

2. The apparatus as recited in claim 1, wherein the second FET driver is configured to get the FET drive control signal directly from the microprocessor so as to drive the second motor, the drive control of each motor being conducted individually, based on the detection result of over current state of each motor when the dual motor is driven.

3. The apparatus as recited in claim 1, wherein the microprocessor measures voltages applied to the first and the second motors and temperatures of the motors, and adds and modifies variations in the measured voltages and temperatures, to thereby compute the normal currents and constraint currents of the first and the second motors.

4. The apparatus as recited in claim 1, wherein the microprocessor sets averages of each of the normal currents and each of the constraint currents of the first and the second motors as the first and the second over current detection reference currents, respectively.

* * * * *